United States Patent
Cripe

[19]

[11] Patent Number: 6,095,458

[45] Date of Patent: Aug. 1, 2000

[54] DYNAMIC WINGED ANIMAL DEVICE

[76] Inventor: James A. Cripe, 2685 E. Driftwood Dr., Coeur d'Alene, Id. 83814

[21] Appl. No.: 09/205,249

[22] Filed: Dec. 4, 1998

[51] Int. Cl.[7] .......................... A63H 27/08; A63H 27/00; A01M 31/06

[52] U.S. Cl. .............................. 244/153 R; 446/61; 43/2; 43/3

[58] Field of Search ................................ 244/153 R, 154, 244/155; 446/61, 62, 67, 68; D21/438, 445, 439; 43/2, 3; D22/125

[56] References Cited

U.S. PATENT DOCUMENTS

| | | | |
|---|---|---|---|
| D. 57,448 | 3/1921 | Shrum | D21/438 |
| 72,855 | 12/1867 | Hughes | 244/153 R |
| D. 196,057 | 8/1963 | Levine | D21/438 |
| D. 196,849 | 11/1968 | Koonce | D21/438 |
| 1,299,465 | 4/1919 | Henley | 446/67 |
| 1,378,193 | 5/1921 | Petty | 446/67 |
| 2,349,417 | 5/1944 | Hor | 244/154 |
| 2,507,777 | 5/1950 | Frey | 244/153 R |
| 3,076,626 | 2/1963 | Andrews | 244/154 |
| 3,110,460 | 11/1963 | Koonce et al. | 244/153 R |
| 3,540,149 | 11/1970 | Lowe | 446/67 |
| 3,707,798 | 1/1973 | Tryon | 43/3 |
| 3,787,998 | 1/1974 | Kilroy, Jr. et al. | 446/61 |
| 3,918,663 | 11/1975 | Cornelison, Jr. | 244/153 R |
| 4,228,977 | 10/1980 | Tanaka | 244/153 R |
| 4,911,384 | 3/1990 | Stankus | 244/153 R |
| 5,293,709 | 3/1994 | Cripe | 43/3 |
| 5,524,851 | 6/1996 | Huang | 244/153 R |
| 5,983,552 | 11/1999 | Nelson | 43/2 |

FOREIGN PATENT DOCUMENTS

| | | | |
|---|---|---|---|
| 511627 | 11/1930 | Germany | 244/153 R |
| 3131874 | 2/1983 | Germany | 244/153 R |
| 26599 | 5/1909 | United Kingdom | 244/155 |

Primary Examiner—Michael J. Carone
Assistant Examiner—Fredrick T. French, III
Attorney, Agent, or Firm—Wells, St. John, Roberts, Gregory & Matkin, P.S.

[57] ABSTRACT

Disclosed is a dynamic winged animal device which includes a body and a lift member which defines a right wing and a left wing. The wings further include a fixed curvature over at the leading edge of the wings to provide airfoil characteristics and movement of the wings of the particular animal being portrayed. A spar or support is attached to the outer portions of the wings and provides a flexible support base for the natural movement of the wings in the air. The distance between the center portion of the wing span and the spar may vary during flight.

13 Claims, 5 Drawing Sheets

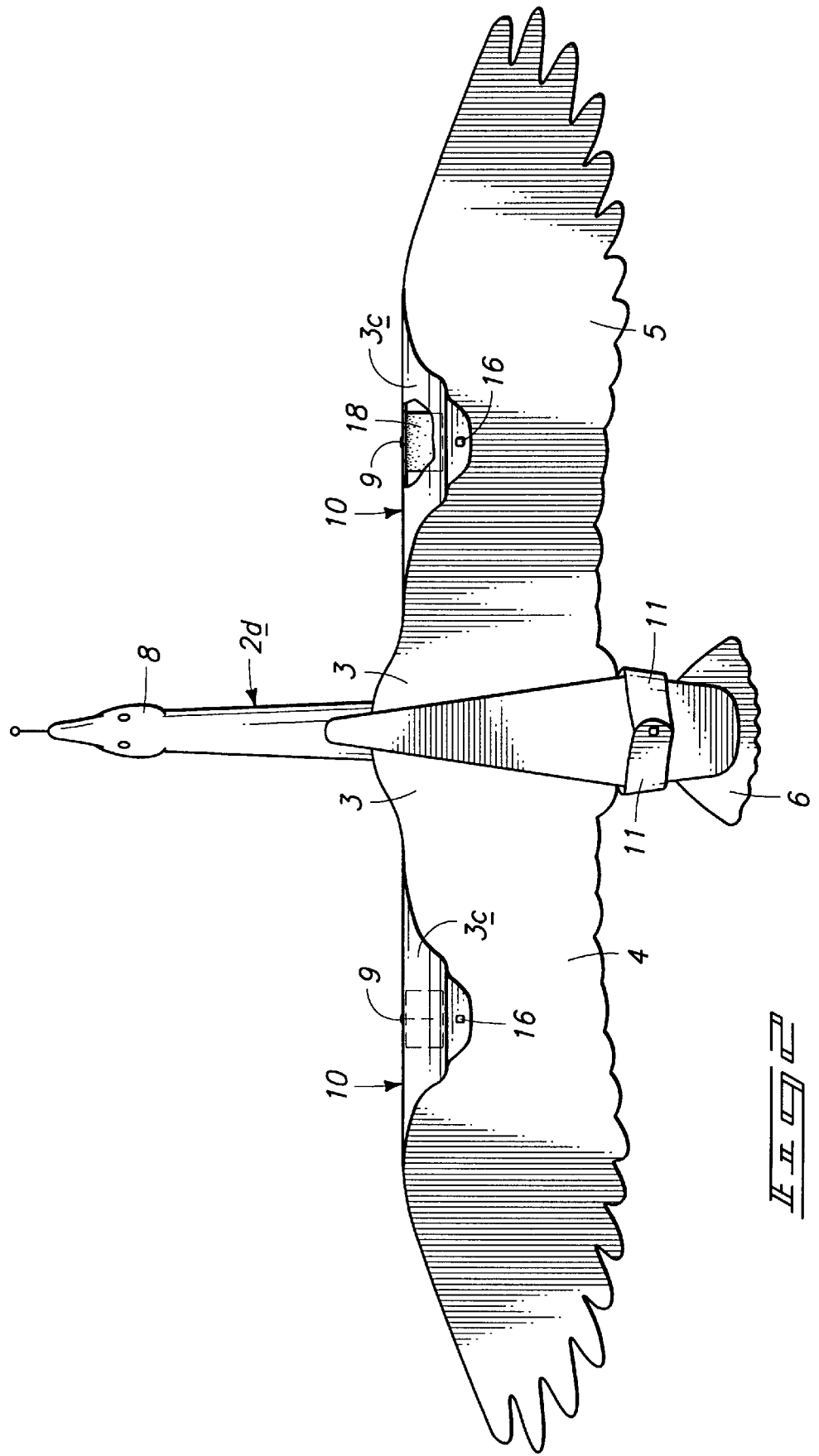

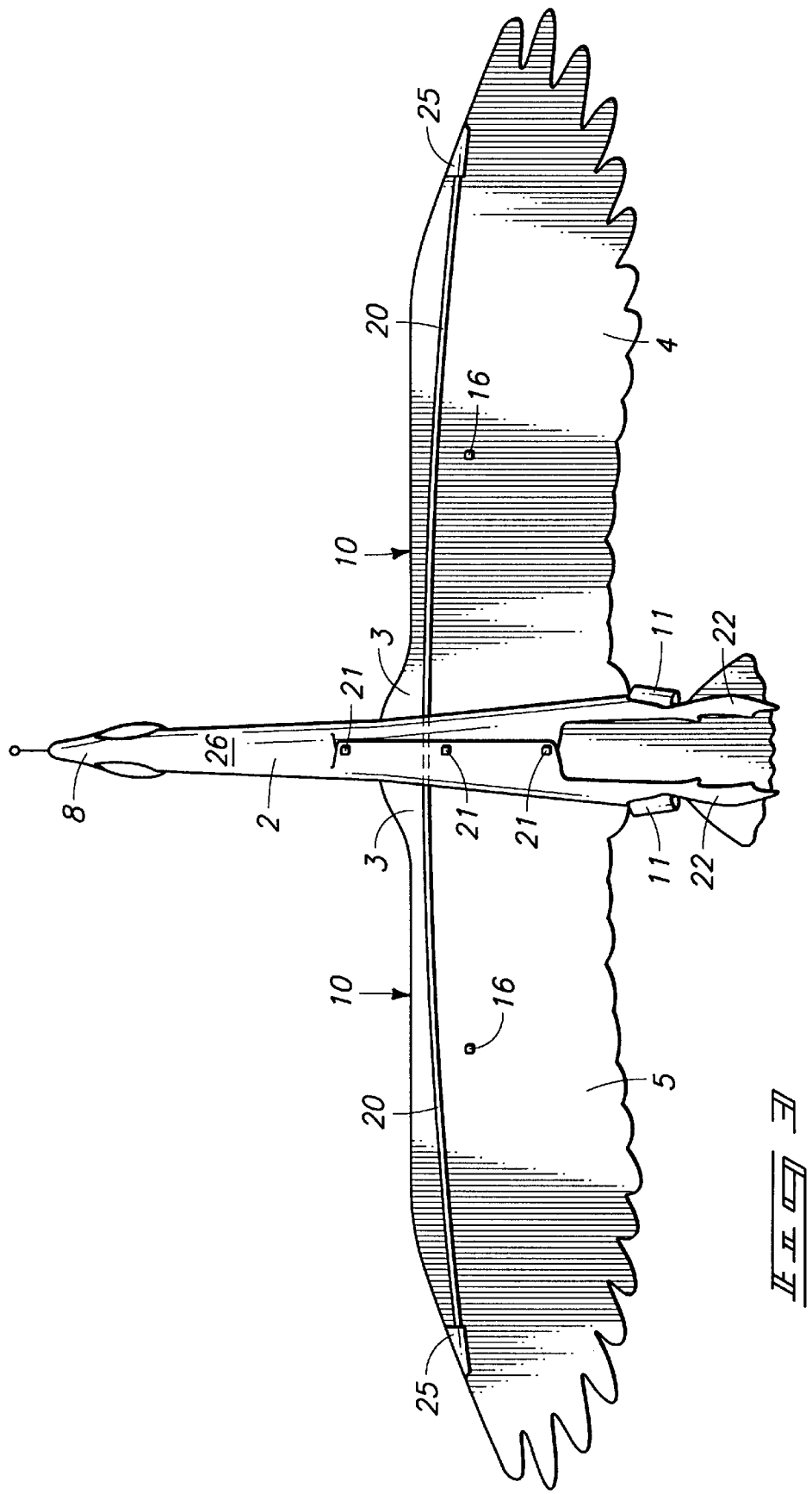

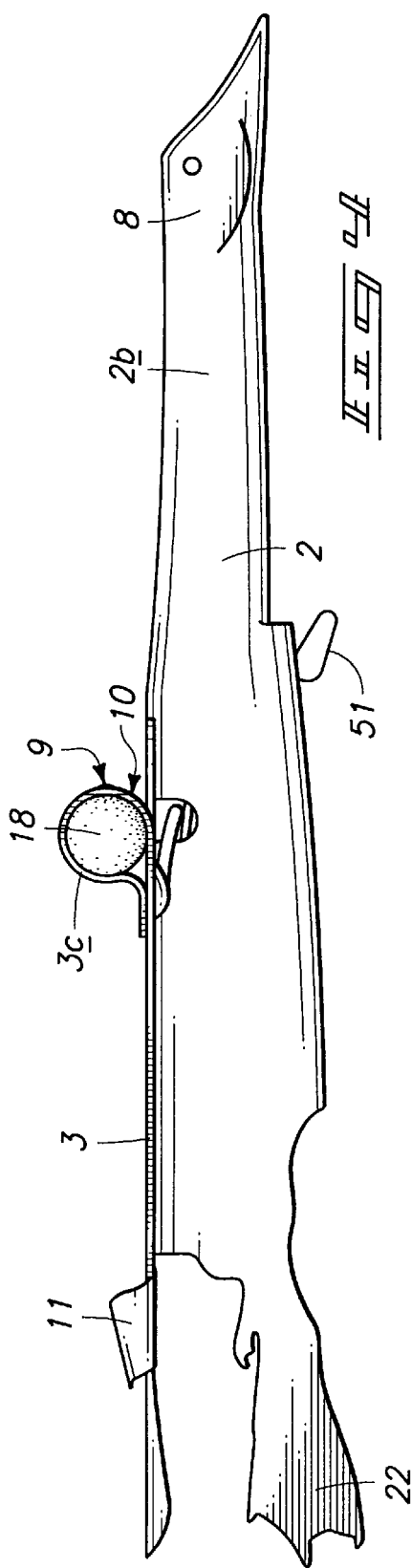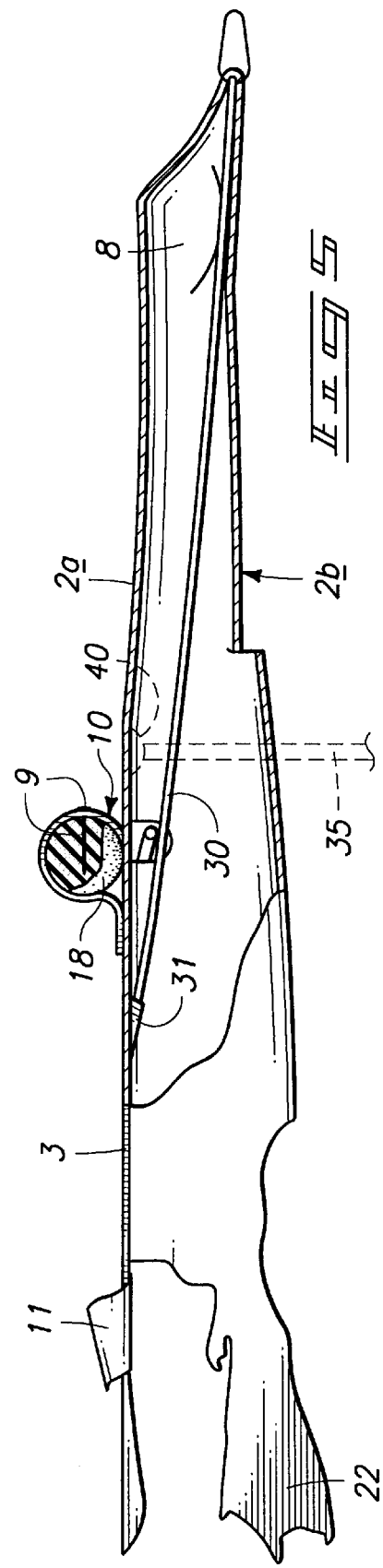

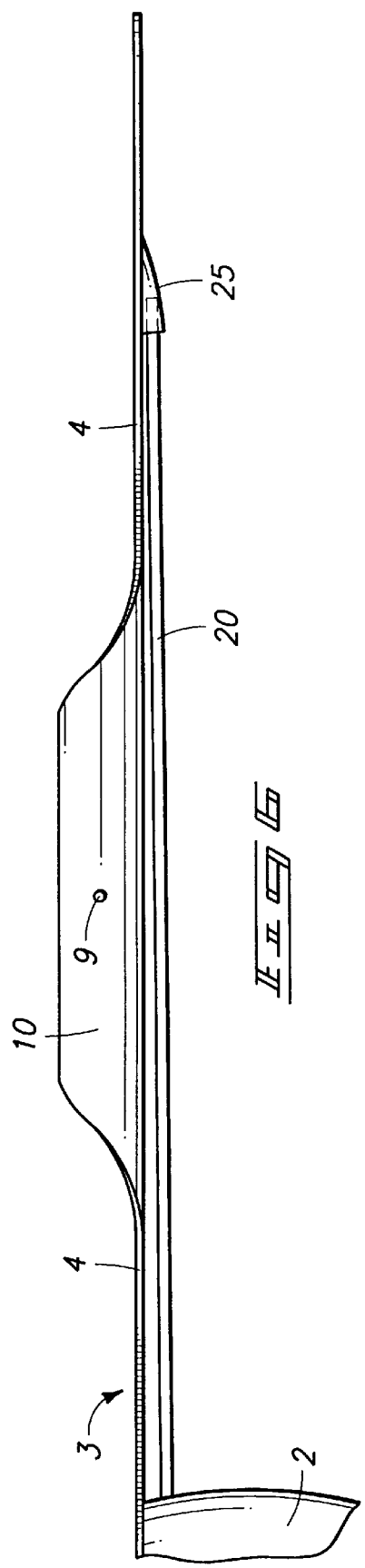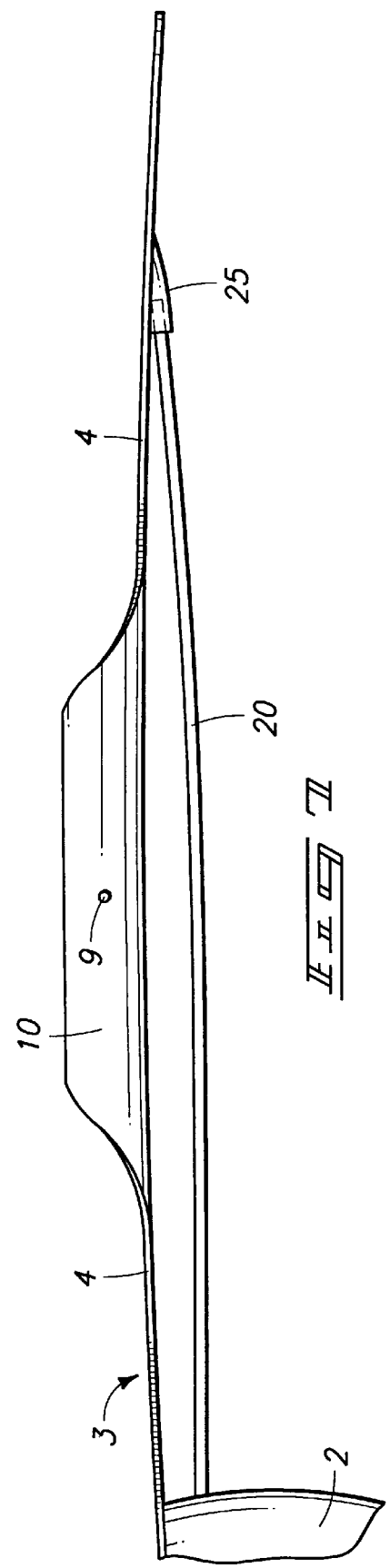

DYNAMIC WINGED ANIMAL DEVICE

TECHNICAL FIELD

This invention generally pertains to a dynamic winged animal device, and more particularly, to such a winged animal device which simulates the wing motion of the bird or animal when wind is applied to it.

BACKGROUND OF THE INVENTION

There have been numerous kites and other animal devices which are designed to look like the foul or animal in question. While most of the kites may look like the bird or animal in question, they do not simulate the wing movement of the bird or animal being portrayed. Most of the prior art kites fly at an unnatural angle and look like a more typical kite in flight, and do not simulate the flight, angle of flight, or wing movement of the bird or animal in question.

It is an object of this invention to provide a winged animal device which achieves wing movement during flight to more closely simulate the wing movement of the bird or animal being portrayed. This winged animal device may be mounted to a post or support on a swivel, or tethered to a kite string and flown as a kite, which reacts to wind with movement of the wings.

It is a further object to provide such a device which can be utilized as a hunting decoy, for recreational kite flying and other desired uses.

It is a still further object to provide such a device which can be more consistently assembled to the desired curvature at the leading edge of the wing, and which will hold the same curvature through its useful life, than prior art devices such as Stankus, U.S. Pat. No. 4,911,384.

These objects and others are achieved, as more fully shown and described herein.

BRIEF DESCRIPTION OF THE DRAWINGS

Preferred embodiments of the invention are described below with reference to the following accompanying drawings.

FIG. 2 is a top view of one embodiment of the winged animal device contemplated by this invention;

FIG. 3 is a bottom view of one embodiment of the winged animal device contemplated by this invention;

FIG. 4 is a right side view of one embodiment of the winged animal device contemplated by this invention;

FIG. 5 is a right side cross-sectional view of one embodiment of the winged animal device contemplated by this invention;

FIG. 6 is a front view of the left wing of this invention, illustrating relative to FIG. 7, a position of the lift member in an at rest position; and FIG. 7 is a front view of the left wing of this invention illustrating a position of the lift member in a position it may be in when wind has been introduced to the wing portion.

DETAILED DESCRIPTION OF THE PREFERRED EMBODIMENTS

Figure 1:
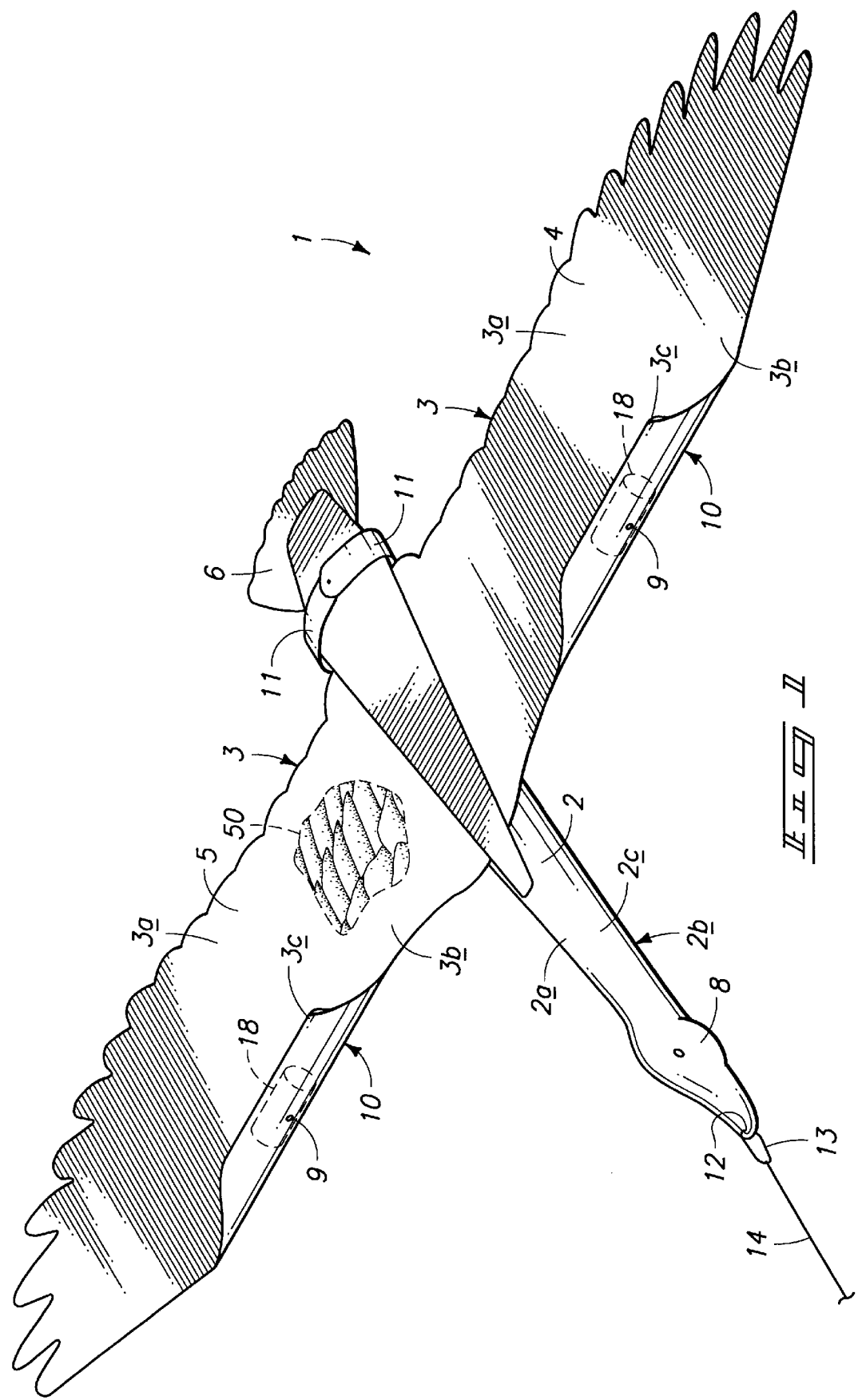
FIG. 1 is a perspective view of one embodiment of the winged animal device contemplated by this invention.

This disclosure of the invention is submitted in furtherance of the constitutional purposes of the U.S. Patent Laws "to promote the progress of science and useful arts" (Article 1, Section 8).

Many of the fastening, connection and other means and components utilized in this invention are widely known and used in the field of the invention described. Their exact nature or type is not necessary for an understanding of the use of the invention by a person skilled in the art or science, and they will not therefore be discussed in significant detail.

Furthermore, the various components shown or described herein for any specific application of this invention can be varied or altered as anticipated by this invention and the practice of a specific application of any element may already be widely known or used in the art or by persons skilled in the art or science and each will not therefore be discussed in significant detail.

The term "animal" as used herein refers not only to animals, but to birds, foul, insects, animated creatures, fictitious or contrived images on the dynamic kite, robots, characters and the like (to the extent these may differ from the term "animal"). The invention is not limited to any particular type of animal, character or image, and the preceding list is not intended to be exhaustive.

While the invention is directed toward a dynamic winged animal device, it will likewise be appreciated by those in the art that this invention can be utilized either as a winged kite for tethered flight, or rotatably mounted to an object such as a support member or post.

FIG. 1 shows one embodiment of the winged animal device 1 contemplated by this invention. FIG. 1 illustrates body 2 comprised of a top side 2a, bottom side 2b, a left side 2c and a right side (which is shown on FIG. 2). FIG. 1 further illustrates lift member 3 having a rearward portion 3a and a forward portion 3b.

The body 2 and lift member 3 may be constructed out of different types of materials within the contemplation of this invention, with the preferred material being flexible and constructed of Dupont's tyvek material.

The animal in FIG. 1 is a portrayal of a goose and therefore includes a goose head 8 and the rearward portion 6 of the body is tail feathers. FIG. 1 illustrates that lift member 3 is attached and oriented approximately transverse to body 2, and lift member 3 forms a right wing 5 which extends laterally from the right side of the body 2, and a left wing 4 which extends laterally from the left side 2c of the body 2.

The leading edges 10 of left wing 4 and right wing 5 are shown in FIG. 1, and are formed by wrapping at least a part of the forward portion 3c of flexible lift member 3 material around curvature support member 18. By wrapping at least a part of the forward portion, or a forward-most portion 3c, of lift member 3 material in this way, and then securing it to the fixed curvature support member 18 (by securement pin 9 lanced through lift member 3 at the leading edge 10 and through curvature support member 18), the amount and nature of the curvature of the leading edge 10 may be predetermined by the selection and use of curvature support member 18. The curvature support member 18 is preferably made of styrofoam. It will be appreciated that the securement pin 9 need not be placed through the lift member 3 at the leading edge, but can be at any location such as from the top of the wrapped portion of the lift member 3.

The leading edges 10 of left wing 4 and right wing 5 are further secured around curvature support member 18 by fastener 16 (which is shown in FIG. 2). There is a similar leading edge configuration for right wing 5 with similar numbers and as also shown on FIG. 1.

While there are other ways to secure the lift member 3 material around curvature support member 18, such as using glue, the preferred way is to utilize a portion of the lift member 3 material, securement pin 9, fold the lift member 3 material back or rearward (around curvature support member 18), and then use fastener 16 to attach what would otherwise be a more forward portion of the lift member 3 (or wing) to a more rearward portion of the lift member 3 (or wing).

The winged animal device may be used as a kite, pivotally attached to a ost or support member (shown as item 40 in FIG. 5), or it may be flown like a windsock. In the situation when it is flown like a windsock, an attachment point 12 such as an aperture may be placed in the forward portion of body 2, and a tether attachment 13 may then be used to secure tether string 14 to attachment point 12, and to cause the flight of the device. The winged animal device may also be flown more as a kite, in which case a tether attachment point will be located further rearward on the body, an example of which is shown in FIG. 4 as kite attachment 51.

In the preferred embodiment, the winged animal device 1 is utilized as a hunting decoy kite, and an image of a duck or goose is imparted the relevant visible outer surface(s) to achieve that result. The image is preferably photographically derived, which is used herein in a broad sense to refer to images which have been derived from a photograph, by any known means of alteration, touch-up, or processing. Utilizing a photographic image makes the invention look more like the bird or animal it is intended to portray, and is believed to make it a more effective decoy during hunting.

Lateral stabilizer 11 is attached to or integral with body 2, and is utilized for lateral stability during flight of the winged animal device 1 during flight (if used as a kite), or during use of the device while it is rotatably mounted on a mount post. Lateral stabilizer 11 is elevated above body 2 and may be truncated for better results. Air flows between lateral stabilizer 11 and the top side 2a of body 2 adjacent to lateral stabilizer 11, to impose lateral stabilization forces on lateral stabilizer 11, thereby achieving lateral control and/or stability.

FIG. 1 also illustrates a photographically derived image 50 which has been imparted on the winged animal device 1. Preferably, the entire portion of the winged animal decoy 1 which is visible to the observer would have a photographically derived image on it. The preferred way to impart such an image is by offset lithography, which is known in the printing industry.

FIG. 2 is a top view of the embodiment of the winged animal device shown in FIG. 1. FIG. 2 illustrates the head 8 of the goose being portrayed, right side 2d of body 2, the leading edges 10 of the left wing 4 and of the right wing 5. FIG. 2 further illustrates lift member 3, curvature support member, and the securement pin 9 penetrated through lift member 3 and through curvature support member 18, securing the curvature support member in place and fixing the curvature of the leading edge 10 of each wing.

The lift member 3 is preferably made of one piece of material and attached transversely to body 2 to form a right wing 5 and a left wing 4. In the preferred embodiment, the shape of body 2 and of the lift member 3 are configured to portray the shape of the animal or bird.

Once the forward-most portion 3c of the lift member 3 is wrapped around and affixed to the curvature support member 18, fastener 16 may be used to secure the leading edge to a more rearward portion of the wing or lift member 3.

FIG. 2 further illustrates lateral stabilizer 11 and the rearward portion 6 of the body, which in this embodiment, simulates the tail feathers of the goose being portrayed. In the preferred embodiment, the lateral stabilizer 11 is formed by bending two pre-formed portions of body 2 upward and securing the ends of the pre-formed portions of the body 2 to one another.

FIG. 3 is a bottom view of the embodiment of the winged animal device 1 shown in FIG. 1, illustrating the head 8 of the goose, the body 2, the lateral stabilizer 11, the right wing 5, and the left wing 4.

Fasteners 21 are similar to fasteners 16 and are utilized to attach one portion of the body 2 to another portion of the body 26, at the bottom side 2b of the body. The preferred fasteners are generally referred to as plastic dress snaps, which are readily available commercially, while numerous other types of fasteners and ways to fasten may be used within the contemplation of this invention.

FIG. 3 further illustrates spar 20, which is attached to lift member 3 by inserting each end of spar 20 into receiving slots 25. Receiving slots 25 are slots or pockets formed by a portion of the material utilized as the lift member 3, or may be separately attached to lift member 3 and are utilized to allow the spar 20 to be attached to lift member 3. Mounting or attaching the spar 20 to the lift member 3 via receiving slots 25, may be done such that there may some relative movement between spar 20 and receiving slot 25 when the lift member 3 or wings are moving, or it may be mounted or attached in a fixed way.

FIG. 3 further illustrates how spar 20 may be preferably inserted through a portion of body 2 for placement and to contribute to holding it in a general position. Spar 20 may be made out of several types of material such as wood, fiberglass or graphite, with the preferred material being fiberglass.

FIG. 4 is a right side view of the embodiment of the winged animal device illustrated in FIG. 1, and shows the head 8 of the portrayed goose, the right side 2b of body 2, the curvature support member 18, the securement pin 9, and the forward-most portion 3c of lift member 3, which is wrapped around curvature support member 18 to form a fixed or predetermined curvature at the leading edge 10 of lift member 3.

FIG. 4 further illustrates lateral stabilizer 11, and the feet 22 of the goose being portrayed.

FIG. 5 shows a right side cross-section view of the winged animal device, illustrating an embodiment of the winged animal device which may also be mounted on a support 35. The winged animal device may be rotatably mounted to the body 2 of the winged animal device utilizing a pivotal mount 40, to allow some rotational movement in response to the wind.

FIG. 5 also illustrates head 8, feet 22, lateral stabilizer 11, the bottom side 2b of body 2, and the leading edge 10 of lift member 3 as secured to curvature support member 18 by securement pin 9.

FIG. 5 further shows an internal body support member 30 which may used to provide longitudinal support and structure for the body of the winged animal device. A first end of body support member 30 slides into receiving slot 31 to attach it to the top side 2a of body 2. A second end of body support member 30, may be positioned at forward location such as in the head 8 of the animal, to position and hold body support member 30 into place, and provide the desired structural support.

FIG. 6 is a front view of the left wing 4 of lift member 3. FIG. 6 illustrates spar 20 engaged in receiving slot 25, and securement pin 9 and body 2. FIG. 6 shows the left wing 4 in a position that could be the position when the device is at rest, i.e. where no wind is forcing relative movement between left wing 4 and spar 20. When wind or forced convection is applied to the leading edge of the lift member 3, it tends to alternately cause: a separation or increased distance between lift member 3 and spar 20 in the center of the span of left wing 4, as more fully illustrated in FIG. 7; and then a decreased distance between lift member 3 and spar 20 in the center of the span of left wing 4; and so on. A similar alternating pattern occurs with right wing 5.

FIG. 7 illustrates left wing 4, spar 20, receiving slot 25, body 2, lift member 3, and securement pin 9 on the leading edge 10 of lift member 3.

FIG. 7 shows one relative position between spar 20 and lift member 3 which can be caused by forced convection or wind applied to the leading edge of lift member 3 or left wing 4. This illustrates an alternate relative position of the spar 20 relative to the lift member 3 in the center portion of the span of left wing 4, to position shown in FIG. 6.

It is believed that the combination of the predetermined or fixed curvature at the leading edge of the wings, with the spar 20, provide the movement of left wing 4 and right wing 5 when wind is applied, thereby simulating wing movement of the goose being portrayed.

The fixed curvature more consistently provides an airfoil like affect to cause the lift member 3 or wing to be alternately: pushed upwardly and pulled away from spar 20, thereby causing spar 20 to be partially bent, thereby induce tension in spar 20, causing it, along with the forces imparted by the wind on the lift member 3, to then push and pull lift member 3 back towards spar 20. The placement of the spar 20 underneath the lift member 3 disposes the spar 20 to impose an opposing force to the lift force which is imparted by the wind on the lift member, tending to pull the lift member 3 back downward.

It will also be appreciated by those skilled in the art that this winged animal device will fly more parallel to the ground, or horizontal, than a typical kite (when used as a kite), due to the combination of elements as more fully described above.

It will also be apparent to those of ordinary skill in the art that the body 2 and the lift member 3 of this invention may, but need not, be formed or cut from one piece of material, including the lift member 3, the body 2, the head 8, the feet 22, the lateral stabilizer 11. However, it may also be desired to place additional layers or pieces in certain locations to provide additional strength, rigidity or other desired characteristics for the particular application, or for other features desired in portraying the animal or bird.

Therefore when the body is referred to or used separate from the term lift member (or wing), this invention still contemplates that the portion representative of the body of the animal may actually be cut from the same piece, or one piece, with part or all of the lift member (or wing).

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:
1. A winged animal device comprising:
 (a) a body having a top side, a right side and a left side;
 (b) a lift member attached and oriented approximately transverse to the body, the lift member forming a right wing which extends laterally from the right side of the body, and a left wing which extends laterally from the left side of the body;
 (c) a flexible spar extending between and being attached to the outer portions of the right wing and the left wing; and
 (d) the right wing and the left wing of the lift member each having a forward portion and a rearward portion, at least a part of the forward portion being bent around a curvature support member and forming a curved leading edge of the lift member; and
 (e) a photographically derived image imparted on the lift member and the body.
2. A winged animal device comprising:
 (a) a body having a top side, a right side and a left side;
 (b) a lift member attached and oriented approximately transverse to the body, the lift member forming a right wing which extends laterally from the right side of the body, and a left wing which extends laterally from the left side of the body;
 (c) a flexible spar extending between and being attached to the outer portions of the right wing and the left wing; and
 (d) the right wing and the left wing of the lift member each having a forward portion and a rearward portion, at least a part of the forward portion being bent around a curvature support member and attached to a more rearward portion of the lift member, thereby forming a curved leading edge of the lift member, which has a predetermined curvature.
3. A winged animal device as recited in claim 1, and further comprising a tether attachment point on the body, disposed to receive a tether string for restraining the device while it is suspended in the air.
4. A winged animal device as recited in claim 1, and further comprising a support post attachment point on the body, disposed to receive a support post to hold the animal device above the ground in a fixed location.
5. A winged animal device as recited in claim 1, and further wherein the lift member has a top side and a bottom side, and the spar is attached to the bottom side of the lift member.
6. A winged animal device as recited in claim 1, and which further comprises a lateral stabilizer integral with the body.
7. A winged animal device as recited in claim 1, and in which the body further comprises a bottom side.
8. A winged animal device comprising:
 (a) a body having a top side, a bottom side, a right side and a left side;
 (b) a lift member attached and oriented approximately transverse to the body, the lift member forming a right wing which extends laterally from the right side of the body, and a left wing which extends laterally from the left side of the body;
 (c) a flexible spar extending between and being attached to the outer portions of the right wing and the left wing; and
 (d) the right wing and the left wing of the lift member each having a forward portion and a rearward portion, at least a part of the forward portion being bent around a curvature support member and attached to a more rearward portion of the lift member, thereby forming a curved leading edge of the lift member, which has a predetermined curvature;

the spar being attached to the outward portions of the right wing and the left wing, such that a force of air applied to the leading edge of the left wing and right wing will cause the distance between the spar and a center portion of the left wing and of the right wing to vary.

9. A winged animal device as recited in claim 7, and further comprising a tether attachment point on the body, disposed to receive a tether string for restraining the device while it is suspended in the air.

10. A winged animal device as recited in claim 7, and further comprising a support post attachment point on the body, disposed to receive a support post to hold the animal device above the ground in a fixed location.

11. A winged animal device as recited in claim 7, and further wherein the lift member has a top side and a bottom side, and the spar is attached to the bottom side of the lift member.

12. A winged animal device as recited in claim 7, and which further comprises a lateral stabilizer integral with the body.

13. A winged animal device as recited in claim 7, and in which the body further comprises a bottom side.

* * * * *